Nov. 20, 1928.  
E. R. WHITNEY  
1,692,603  
CHASSIS FOR MOTOR VEHICLES  
Filed Sept. 5, 1924  
2 Sheets-Sheet 1
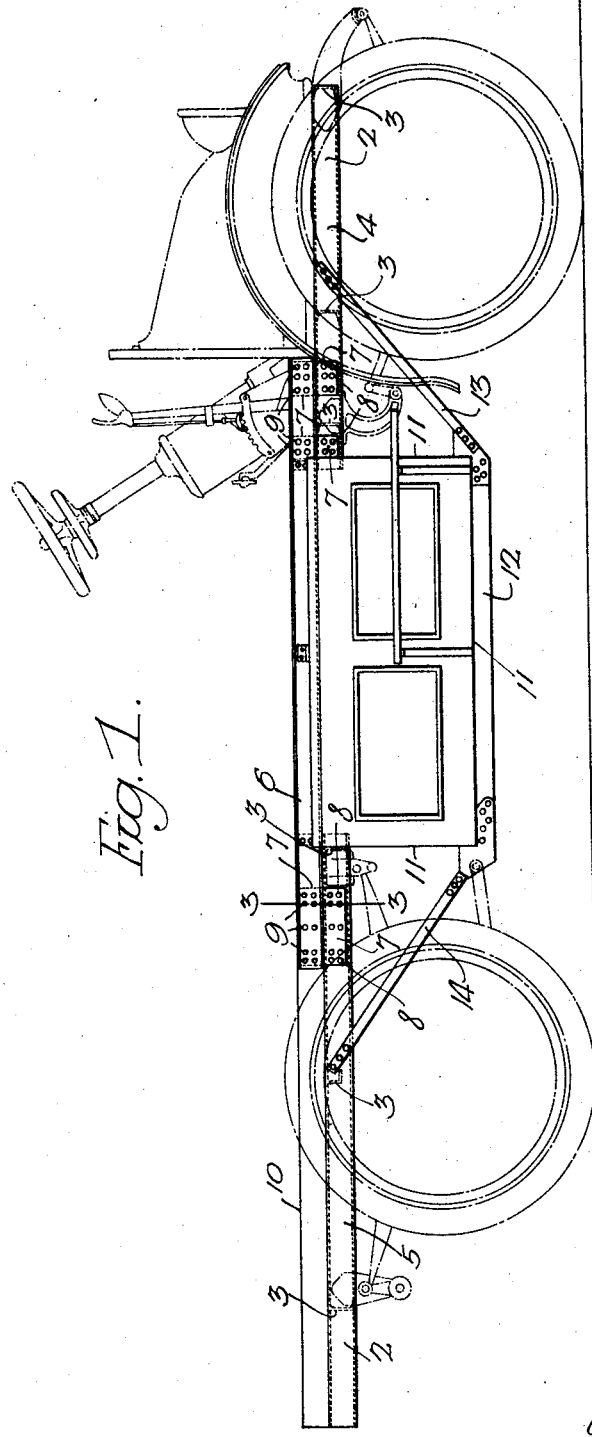
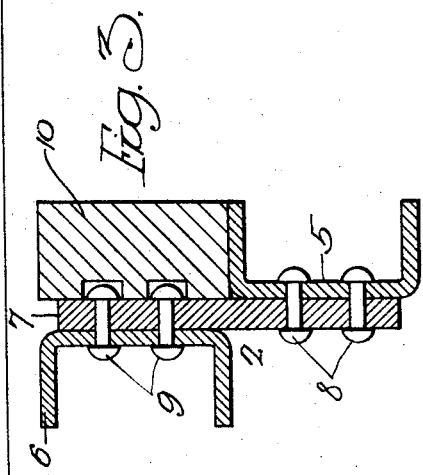
Inventor.  
Eddy R. Whitney.  
by his Attorneys.  
Howson & Howson.

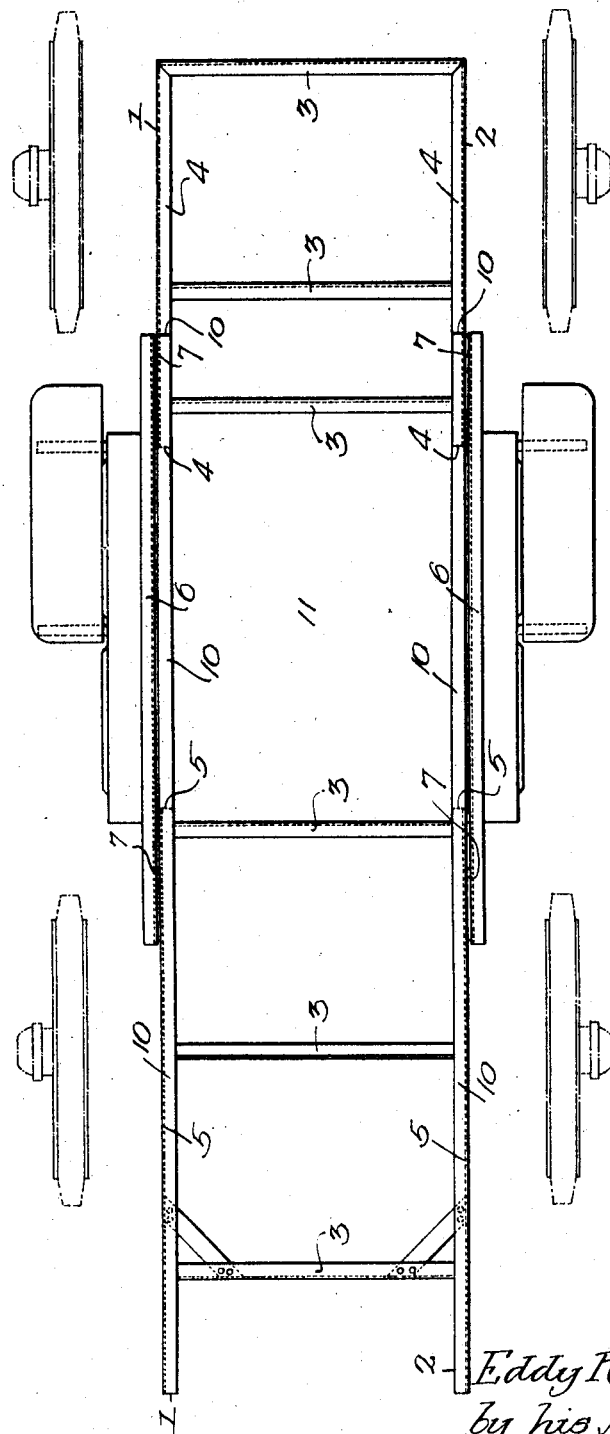

Patented Nov. 20, 1928.

1,692,603

UNITED STATES PATENT OFFICE.

EDDY R. WHITNEY, OF PHILADELPHIA, PENNSYLVANIA, ASSIGNOR, BY MESNE ASSIGNMENTS, TO WALKER VEHICLE COMPANY, OF CHICAGO, ILLINOIS, A CORPORATION OF ILLINOIS.

CHASSIS FOR MOTOR VEHICLES.

Application filed September 5, 1924. Serial No. 736,049.

The invention relates to the chassis of electrically-driven vehicles, and the principal object of the invention is to provide a novel form of chassis providing a maximum clearance between the bottom of an underslung battery box and the ground, and without at the same time raising the floor of the body nor elevating the part of the chassis frame over the axles to which the springs are attached.

The invention further resides in certain novel and advantageous details of construction hereinafter described and illustrated in the attached drawings, in which:

Figure 1 is a side elevation of a chassis made in accordance with my invention;

Fig. 2 is a plan view of the chassis, and

Fig. 3 is a section on the line 3—3, Fig. 1.

It is customary in vehicles employing electric drives to utilize chassis of the same general construction as employed in motor vehicles of other types, and to provide these chassis with means for underslinging the box which houses the batteries. While this construction has been found generally satisfactory, there are some sections of the country in which conditions are such that it is desirable, where the maximum clearance afforded by the usual construction is not sufficient, to increase the clearance between the bottom of the battery box and the ground. To fill this requirement, I have developed a chassis construction which without undue complication or undue increase in manufacturing cost provides the clearance required without raising the body floor, and still affording satisfactory mounting for the springs.

With reference to the drawings, the chassis comprises the usual longitudinal side beams 1 and 2 joined together by cross bars 3. Instead, however, of being substantially straight as in the usual construction, these side beams 1 and 2 are formed intermediate their ends with an elevated section forming a recess of such dimensions as to accommodate the batteries, which thereby are elevated to an extent corresponding to the depth of this recess.

In forming this recess, I prefer to employ instead of integral side beams, beams composed of three sections,—a forward section 4, a rear section 5, and an intermediate elevated section 6. The elevated section 6 is secured to the sections 4 and 5 by means of plates 7, 7, respectively secured to the rear end of the front section 4, and the forward end of the rear section 5, by means of rivets 8, these plates extending above the tops of the said front and rear sections, as best shown in Fig. 3. To the upwardly projecting portions of the plates 7 are secured the ends of the intermediate section 6, by means in the present instance of rivets 9. The front, rear and intermediate sections are in the present instance formed of channel iron and are placed on edge after the usual fashion, the flanges or legs of the channels constituting the front and rear sections being turned inwardly, and the plate 7 being secured to the outside of the channels. The intermediate channels 6 are disposed with their flanges or legs projecting outwardly and are secured to the outer face of the said plate 7, as clearly shown in Fig. 3, thereby being offset laterally from the aligned front and rear sections.

With this construction, I may employ the usual wooden body-supporting beam 10, which rests upon the tops of the front and rear sections of the side beams and bridges the space therebetween, the side of the beam abutting the inside of the plates 7, as shown. The offset nature of the intermediate sections, it will be noted, permits the beams 10 to occupy their normal positions above the front and rear side beam sections.

Suspended below the intermediate sections 6, 6, are the usual slings which support the floor of the casing 11, these supporting slings comprising base bars 12 supported at their ends by diagonal bars 13 and 14 whose upper ends are attached respectively to the front and rear frame sections 4 and 5. Seated on these slings, one of which is positioned at each side of the frame, is the box or casing 11, which preferably is built-in but which obviously may take any one of a large number of forms. The casing extends upwardly between the ends of front and rear sections and abuts the under side of the body beam 10, the elevation of the intermediate frame sections 6, 6, providing the additional head room required to give the desired clearance between the road and the bars 12.

Referring to the general practice of mounting bodies on automobile chassis by means of longitudinal wooden members or stringers which rest on the top of and are attached to the chassis frame, and upon which the body proper is constructed, the hereindescribed arrangement of the frame members of the chassis will permit of this method of mounting the body without increasing its floor height, at the same time giving the additional ground clearance under the battery. This is done by placing the longitudinal wooden stringers or beams 10, see Fig. 3, in their usual position on top of the frame members 4 and 5 and as described continuing them in one piece over the battery compartment 11. This is made possible by elevating and offsetting the intermediate sections of the side beams. This construction also leaves the side beams 1 and 2 at their normal location at the front and rear ends, which are the parts to which the springs are attached. It will be seen that this permits of a more desirable spring design than if the side beams were continued for their full length in the elevated position of the mid sections over the battery compartment.

I claim:

1. In a chassis frame, the combination with side beams comprising each a front section, a rear section aligned with and spaced apart from the front section, and an intermediate section connecting said front and rear sections and offset therefrom both laterally and upwardly, and a body-supporting beam mounted over the tops of said front and rear sections and bridging the space therebetween.

2. In a chassis frame, the combination with side beams comprising each a front section, a rear section aligned with and spaced apart from the front section, and an intermediate section connecting and occupying a position laterally and above said front and rear sections, the offset arrangement of said intermediate sections providing for the placing of a body-supporting beam directly over said front and rear sections and bridging the space therebetween.

3. In a chassis frame, the combination with side beams comprising each a front section, a rear section aligned with and spaced apart from the front section, and an intermediate section uniting and displaced from said front and rear sections both laterally and upwardly, and a body-supporting beam mounted over the tops of said side beams and abutting the intermediate sections.

4. In a chassis frame, the combination with side beams comprising each a front section, a rear section aligned with and spaced apart from the front section, an intermediate connecting section above and offset laterally from said front and rear sections, a body-supporting beam mounted above the tops of said front and rear sections, and a casing extending into the space between said front and rear sections and abutting the under side of said body-supporting beam.

5. In a chassis frame, the combination with side beams comprising each a front section, a rear section aligned with and spaced apart from the front section, a plate secured to the outer face of each of said sections, and an intermediate connecting section secured to the outer faces of each of said plates at a point above the said front and rear sections, a body-supporting beam extending along the tops of and bridging the space between said front and rear sections, a casing extending into the space between said front and rear sections and abutting the under side of said beams, and means for supporting said casing.

6. In a chassis frame, the combination with side beams comprising each a front section and a rear section aligned with and spaced apart from the front section, a body-supporting beam resting directly on the tops of said side beams and bridging the space between said front and rear sections, and means independent of said beams for rigidly connecting the adjacent ends of the front and rear sections together.

EDDY R. WHITNEY.